US012708129B2

(12) United States Patent
Geissler et al.

(10) Patent No.: US 12,708,129 B2
(45) Date of Patent: Aug. 18, 2026

(54) USE OF NARINGENIN FOR IMPROVING THE TASTE QUALITY OF PHLORETIN

(71) Applicant: SYMRISE AG, Holzminden (DE)

(72) Inventors: Torsten Geissler, Einbeck (DE); Jakob Peter Ley, Holzminden (DE); Egon Gross, Holzminden (DE); Katharina Reichelt, Holzminden (DE); Thomas Riess, Holzminden (DE); Tom Somers, Holzminden (DE)

(73) Assignee: SYMRISE AG, Holzminden (DE)

( * ) Notice: Subject to any disclaimer, the term of this patent is extended or adjusted under 35 U.S.C. 154(b) by 438 days.

(21) Appl. No.: 18/258,417

(22) PCT Filed: Dec. 21, 2020

(86) PCT No.: PCT/EP2020/087441

§ 371 (c)(1),
(2) Date: Jun. 20, 2023

(87) PCT Pub. No.: WO2022/135661

PCT Pub. Date: Jun. 30, 2022

(65) Prior Publication Data

US 2024/0298686 A1 Sep. 12, 2024

(51) Int. Cl.

*A23L 27/00* (2016.01)
*A23L 27/10* (2016.01)
*A23L 27/30* (2016.01)

(52) U.S. Cl.

CPC ............... *A23L 27/84* (2016.08); *A23L 27/10* (2016.08); *A23L 27/33* (2016.08); *A23L 27/86* (2016.08); *A23L 27/88* (2016.08)

(58) Field of Classification Search

None

See application file for complete search history.

(56) References Cited

U.S. PATENT DOCUMENTS

| | | | |
|---|---|---|---|
| 2015/0320101 A1 | 11/2015 | Walton et al. | |
| 2019/0289886 A1* | 9/2019 | Kiefl ...................... | A61K 47/24 |

FOREIGN PATENT DOCUMENTS

| | | |
|---|---|---|
| JP | 2019501648 A | 1/2019 |
| WO | 2017071784 A1 | 5/2017 |
| WO | 2017092796 A1 | 6/2017 |
| WO | 2017092796 A8 | 7/2017 |
| WO | 2020126688 A1 | 6/2020 |

OTHER PUBLICATIONS

Japanese Office Action and English translation mailed on Dec. 9, 2024 for corresponding Japanese Application No. 2023-537682.

International Search Report and Written Opinion issued on Sep. 23, 2021 for corresponding PCT Application No. PCT/EP2020/087441.

* cited by examiner

*Primary Examiner* — Jyoti Chawla
(74) *Attorney, Agent, or Firm* — POLSINELLI PC

(57) ABSTRACT

The present invention relates to the use of naringenin for improving the taste quality of phloretin. Additionally, the present invention relates to a method for improving the taste quality of phloretin. Furthermore, the invention relates to aroma compositions containing naringenin and phloretin as well as semi-finished and finished products containing the aroma compositions.

10 Claims, 4 Drawing Sheets

USE OF NARINGENIN FOR IMPROVING THE TASTE QUALITY OF PHLORETIN

CROSS-REFERENCE TO RELATED APPLICATIONS

Figure 1:
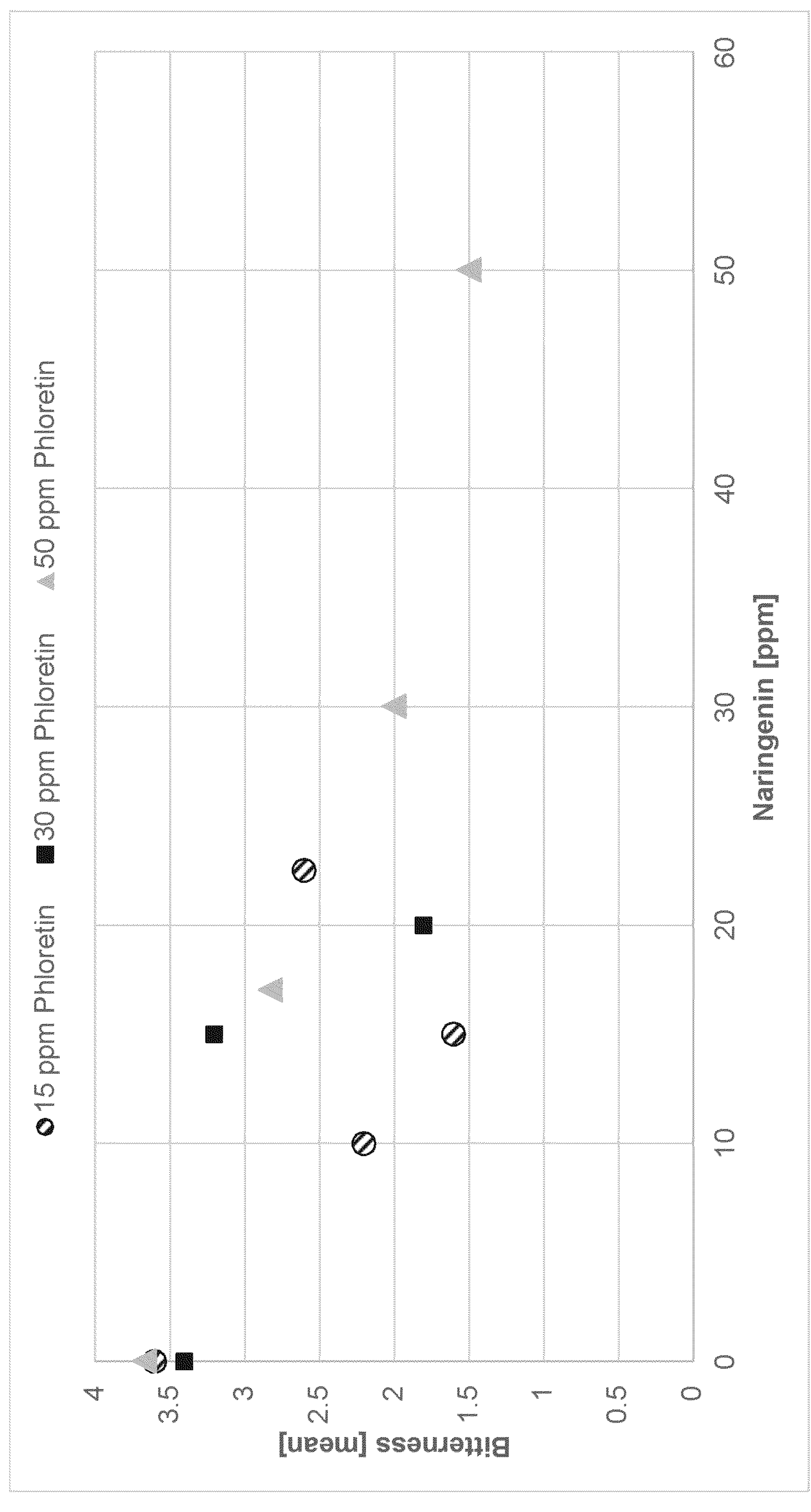

This application is a national stage application (under 35 U.S.C. § 371) of PCT/EP2020/087441, filed Dec. 21, 2020, which is incorporated herein by reference in its entirety.

The present invention relates to the use of naringenin for improving the taste quality of phloretin. Additionally, the present invention relates to a method for improving the taste quality of phloretin. Furthermore, the invention relates to aroma compositions containing naringenin and phloretin as well as semi-finished and finished products containing the aroma compositions.

Food or beverages having a high sugar content (primarily sucrose, lactose, glucose or fructose or mixtures thereof) and therefore a sweet taste are usually strongly preferred by consumers. It is generally known that the consumption of a high content of easily metabolisable carbohydrates such as the above-described sugars allows the blood sugar level to greatly increase and could potentially—if consumed in excess—lead to the formation of fatty deposits. This can cause, if not controlled or counteracted, excess weight, obesity, insulin resistance, late-onset diabetes and associated secondary diseases. In particular, many of the above-mentioned carbohydrates can also affect dental health as they are broken down by specific types of bacteria in the oral cavity into lactic acid and can attack the tooth enamel of adolescent or adult teeth leading to the formation of holes or inflammatory.

The aim is therefore to decrease the amount of sugar in foods and beverages to a minimal amount, preferably such as that the consumer does not note a difference in taste. One possibility to retain the sweet taste is the use of sweeteners. These are substances, which do not themselves have a calorific value, or have only a very low calorific value, and simultaneously give a strong sweet taste impression. The substances are usually non-cariogenic (overview: Valerie B. Duffy, Madeleine Sigman-Grant, Margaret A. Powers, Denise Elmore, Esther F. Myers, Diane Quagliani, Marie Spano, Kimberly F. Stitzel, Sue Taylor, Robert Earl and Sonja Connor, *Journal of the American Dietetic Association* 2004, 104 (2), 255-275). Some of them are known as bulk sweeteners, such as sorbitol, mannitol or other sugar alcohols, and can also partially replace the remaining food technology-related properties of sugars, but too frequent intake leads to osmotically-induced digestion problems among some people. Because of their low concentration in use, the non-nutritive, highly intensive sweeteners are very suitable for bringing sweetness into foods. Nonetheless, they often exhibit taste-related problems as a result of time-intensity profiles which are not similar to sugar (e.g. sucralose, stevioside, cyclamate), a bitter and/or astringent aftertaste (e.g. acesulfame K, saccharin), or additional undesired flavour impressions (e.g. glycyrrhetinic acid ammonium salt).

One high-potential sweetener is phloretin as described in WO 2007/014879. Phloretin gives an intense sweet taste to compositions when incorporated therein, even at low levels. It was observed that the use of phloretin could additionally bring undesired tastes into the composition used in.

Bitter taste is caused by particular substances, which bind to special bitter receptors on taste cells (which are to be found in the taste buds on the tongue) and cause a signal in the following neurochemical cascades. This signal causes a defense reaction and a negative taste impression (cf. Wolfgang Meyerhof, *Reviews of Physiology, Biochemistry and Pharmacology* 2005, 154, 37-72).

One strategy to cover this bitter aftertaste is the use of taste modifiers, which themselves do not exhibit a certain taste perception, but are able to reduce the so-called "off-notes", which describe undesired tastes in compositions, to a minimum. One such substance is naringenin, a flavonoid, which is naturally derived from citrus fruits. The use of naringenin for taste modification, especially for enhancing the sweetness of a composition was already described in the state of the art, e.g. in WO 2017036518 A1 in the context of citrus products.

It was already described in WO 2017092796 A1 that naringenin could potentially influence the taste of phloretin in compositions. It is disclosed that this effect is observed in an exemplary composition containing 30 ppm phloretin and 30 ppm naringenin.

In the aroma industry, often specific dosing regimes are desirable or required. In complex aroma compositions, concentration regimes often do not only depend on a single compound, but are moreover the interplay of different sweeteners, flavours and/or taste modifiers and therefore need to be perfectly balanced.

The primary task of the present invention was therefore to find novel concentration regimes, where the undesired taste characteristics of phloretin can be modified or masked in an advantageous manner.

Other tasks become apparent in view of the attached claims and the following description.

The primary task was solved by the use of naringenin for decreasing the bitterness and/or improving the mouthfeel and/or decreasing the astringency and/or improving the sweetness intensity of or in a preparation comprising phloretin wherein naringenin is used in an amount of 10 ppm to 100 ppm, preferably of 15 ppm to 80 ppm, most preferably of 20 ppm to 50 ppm, based on the total amount of the preparation, with the proviso that in case naringenin is used for decreasing the bitterness of or in a preparation comprising 30 ppm phloretin, naringenin is not contained in an amount of 30 ppm, in each case based on the total amount of the preparation, and in case naringenin is used for improving the mouthfeel of a preparation comprising 30 ppm phloretin, naringenin is not contained in an amount of 30 ppm, in each case based on the total amount of the preparation.

In one embodiment of the present invention, naringenin is used for decreasing the bitterness of or in a preparation comprising phloretin as defined above. In another embodiment, naringenin is used for decreasing the bitterness and improving the mouthfeel of or in a preparation comprising phloretin as defined above. Another embodiment relates to the use of naringenin for decreasing the bitterness, improving the mouthfeel and decreasing the astringency of or in a preparation comprising phloretin. One embodiment of the present invention relates to the use of naringenin for decreasing the bitterness, improving the mouthfeel, decreasing the astringency and improving the sweetness of or in a preparation comprising phloretin. In yet another embodiment, naringenin is used for improving the mouthfeel of or in a preparation comprising phloretin. Another embodiment relates to the use of naringenin for improving the mouthfeel and decreasing the astringency of or in a preparation comprising phloretin. Yet another embodiment relates to the use of naringenin for improving the mouthfeel, decreasing the astringency and improving the sweetness of or in a composition comprising phloretin. One embodiment of the present invention relates to the use of naringenin for decreasing the astringency of or in a composition comprising phloretin. In yet another embodiment, naringenin is used for decreasing the astringency and improving the sweetness of a composition comprising phloretin, wherein in another embodiment relates to the use of naringenin for improving the sweetness of a composition comprising phloretin.

"Decreasing the bitterness" in terms of the present invention is to be understood as a perceivable positive alteration in the bitterness of a preparation in comparison to a reference preparation, which does not comprise naringenin. This means that the reference preparation is perceivable more bitter than a preparation as defined in course of the present invention.

"Improving the mouthfeel" in terms of the present invention is to be understood as a fuller taste perception with a rich, mouth filling taste in comparison to a reference preparation, which does not comprise naringenin. The taste perception "mouthfeel" is known in Japan as "kokumi". It is assumed that this taste is caused by degraded protein fragments, which are formed in food or beverages with a long processing time. The protein fragments themselves do not exhibit a certain taste, but are able to stimulate the overall taste perception by binding to specific receptors in the oral cavity.

"Decreasing the astringency" in terms of the present invention is to be understood as a diminished furry mouthfeel in a preparation in comparison to a reference preparation, which does not comprise naringenin. The "taste" perception astringency is not a real taste, more a "pain" perception, which is detected by the trigeminal nerve and triggers the astringency feeling on the tongue or in the oral cavity. The astringency perception is often also described as a furry feeling in the mouth.

"Improving the sweetness" in terms of the present invention is to be understood as an increase in the sweet taste perception of a preparation in comparison to a reference preparation, which does not comprise naringenin.

The person skilled in the art is aware of methods and experimental test procedures to evaluate the difference in the taste perception of two preparations. A commonly used testing procedure is the tasting of two preparations having a different composition by a panel of trained tasters.

Surprisingly it was found that naringenin was able to decrease the bitterness of phloretin at different dosing regimes between 10 ppm and 100 ppm naringenin of or in a composition comprising phloretin.

One preferred embodiment of the present invention relates to the use according to the invention with the proviso that in case the preparation comprises 30 ppm phloretin, naringenin is not contained in an amount of 30 ppm.

It is preferred in the context of the invention that the weight ratio of naringenin and phloretin in the preparation is in the range of from 1:5 to 5:1, preferably of from 1:3 to 3:1, more preferably of from 1:1.5 to 1.5:1.

As the task of the present invention relates to the exploring of novel concentration regimes for improving the taste quality of phloretin, it is crucial to also find different dosing ratios between naringenin and phloretin to offer a more flexible dosing for achieving the effect according to the invention.

It was found by the inventors of the present invention that naringenin was able to improve the above-defined taste perceptions of or in a composition comprising phloretin at a variety of ratios of naringenin and phloretin.

It is especially preferred if naringenin and phloretin are used at equal concentrations resulting in a 1:1 weight ratio.

Furthermore, preferably the preparation is selected from the group consisting of aroma compositions, preparations intended for nutrition, enjoyment or cosmetic or pharmaceutical purposes, and semi-finished products for producing such preparations.

Preferably, a preparation intended for nutrition or enjoyment may be selected from the group consisting of (reduced-calorie) baked goods (e.g. bread, dry biscuits, cakes, other baked articles), confectionery (e.g. muesli bar products, chocolates, chocolate bars, other products in bar form, fruit gums, dragees, hard and soft caramels, chewing gum), non-alcoholic drinks (e.g. cocoa, coffee, green tea, black tea, (green, black) tea drinks enriched with (green, black) tea extracts, rooibos tea, other herbal teas, fruit-containing soft drinks, isotonic drinks, refreshing drinks, nectars, fruit and vegetable juices, fruit or vegetable juice preparations), instant drinks (e.g. instant cocoa drinks, instant tea drinks, instant coffee drinks), meat products (e.g. ham, fresh sausage or raw sausage preparations, spiced or marinated fresh or salt meat products), eggs or egg products (dried egg, egg white, egg yolk), cereal products (e.g. breakfast cereals, muesli bars, precooked ready-to-eat rice products), dairy products (e.g. full-fat or reduced-fat or fat-free milk drinks, rice pudding, yoghurt, kefir, cream cheese, soft cheese, hard cheese, dried milk powder, whey, butter, buttermilk, ice-cream, partially or completely hydrolysed milk-protein-containing products), products made from soy protein or other soybean fractions (e.g. soy milk and products produced therefrom, drinks containing isolated or enzymatically treated soy protein, drinks containing soy flour, preparations containing soy lecithin, fermented products such as tofu or tempeh or products produced therefrom and mixtures with fruit preparations and optionally flavours), dairy-like preparations (milk-type, yoghurt-type, dessert-type, ice cream) from protein rich plant materials (e.g. from seed materials of oat, almond, pea, lupine, lentils, faba beans, chickpea, rice, canola), plant protein-enriched non-dairy drinks, fruit preparations (e.g. jams, sorbets, fruit sauces, fruit fillings), vegetable preparations (e.g. ketchup, sauces, dried vegetables, frozen vegetables, precooked vegetables, boiled-down vegetables), snacks (e.g. baked or fried potato crisps or potato dough products, maize- or groundnut-based extrudates), fat- and oil-based products or emulsions thereof (e.g. mayonnaise, remoulade, dressings, in each case full-fat or reduced-fat), other ready-made dishes and soups (e.g. dried soups, instant soups, precooked soups), spices, spice mixtures and in particular seasonings which are used, for example, in the snacks field, sweetener preparations, tablets or sachets, other preparations for sweetening or whitening drinks.

The preparation intended for nutrition or enjoyment within the meaning of the invention can also be present as dietary supplements in the form of capsules, tablets (uncoated and coated tablets, e.g. gastro-resistant coatings), sugar-coated pills, granulates, pellets, solid mixtures, dispersions in liquid phases, as emulsions, as powders, as solutions, as pastes or as other formulations that can be swallowed or chewed.

Preferably, a semi-finished preparation is intended to be used to prepare or to be a part of the (finished) preparation intended for nutrition or enjoyment as defined above and can be a flavoring composition, a concentrate and/or an intermediate. A semi-finished preparation can also be used to prepare or to be a part of another semi-finished preparation.

It is preferred that the preparation additionally comprises at least one compound conveying a sweet taste, preferably selected from the group consisting of natural sweeteners, preferably naturally occurring sweet tasting substances, including plant extracts, such as sweet tasting carbohydrates (such as sucrose, trehalose, lactose, maltose, melizitose, melibiose, raffinose, palatinose, lactulose, D-fructose, D-glucose, D-galactose, I-rhamnose, D-sorbose, D-mannose, D-tagatose, D-arabinose, I-arabinose, D-ribose, D-glyceraldehyde, maltodextrin), sugar alcohols (such as erythritol, threitol, arabitol, ribitol, xylitol, sorbitol, mannitol, maltitol, isomaltit, dulcitol, lactitol), proteins (such as miraculin, pentaidin, monellin, thaumatin, curculin, brazzein, mabinlin), D-amino acids (such as D-phenylalanine, D-tryptophan) or extracts or fractions obtained from natural sources containing these amino acids and/or proteins and the physiologically acceptable salts of these amino acids and/or proteins, particularly the sodium, potassium, calcium or ammonium salts thereof; neohesperidindihydrochalkon, naringindihydrochalkon, steviolgylcoside, stevioside, steviolbiosid, rebaudioside, rebaudioside A, rebaudioside B, rebaudioside C, rebaudioside D, rebaudioside E, rebaudioside F, rebaudioside G, rebaudioside H, rebaudioside M, rebaudioside N, rebaudioside X, dulcoside, rubusoside, suavioside A, suavioside B, suavioside G, suavioside H, suavioside I, suavioside J, baiyunoside 1, baiyunoside 2, phlomisoside 1, phlomisoside 2, phlomisoside 3, phlomisoside 4, abrusoside A, abrusoside B, abrusoside C, abrusoside D, cyclocaryoside A, cyclocaryoside I, oslandin, polypodoside A, strogin 1, strogin, 2, strogin 4, selligueanin A, dihydroquercetin-3-acetate, perillartin, telosmosid A15, periandrin I-V, pterocaryoside, cyclocaryoside, mukurozioside, trans-Anethol, trans-cinnamaldehyd, bryoside, bryonoside, bryonodulcoside, carnosifloside, scandenoside, gypenoside, hematoxylin, cyanin, chlorogenssure, albiziasaponin, telosmoside, gaudichaudiosid, mogrosides, such as mogroside V, hernandulcine, monatin, glycyrrhetinic acid and its derivatives, particularly glycyrrhizin, preferably glycyrrhizin ammonium salt; extracts or enriched fractions of such extracts such as extracts of thaumatococcus or *stevia* ssp., particularly *Stevia rebaudiana*, swingle extracts, particularly *momordica* or siratio *grosvenorii* or Luo-Han-Guo, extracts of glycerrhyzia ssp., particularly glycerrhyzia *glabra*, extracts of *Rubus* ssp., particularly *Rubus suavissimus*, extracts of *Lippia dulcis*, extracts of *Mycetia balansae*, preferably comprising balansin A and/or balansin B;

synthetic sweeteners, preferably synthetic sweet tasting substances, preferably selected from the group consisting of magap, sodium cyclamate or other physiologically acceptable salts of cyclamic acid, acesulfam K; neohesperidindihydrochalcone, naringindihydrochalcone, saccharin, saccharin sodium salt, aspartam, superaspartam, neotam, alitam, advantam, perillartin, sucralose, lugduname, carrelame, sucrononate or sucrooctate or mixtures thereof.

Additionally or alternatively, it is preferred that the preparation additionally comprises a flavouring, preferably selected from the group consisting of aliphatic flavouring substances, especially saturated aliphatic alcohols, such as ethanol, isopronanol, butanol, isoamyl alcohol, hexanol, 2-heptanol, octanol (1/2/3), decanol, unsaturated aliphatic alcohols, such as cis-2 pentenol, cis-3 hexenol, trans-2 hexenol, trans-3 hexenol, cis-2 octenol, 1-octen-3-ol, cis-6 nonen-1-ol, trans-2, cis-6 nonadienol, aliphatic aldehydes such as saturated aliphatic aldehydes (e.g. acetaldehyde, propionaldehyde, butyraldehyde, isobutyraldehyde, valeraldehyde, isolvaleraldehyde, hexanal, 3-methyl hexanal, octanal, nonanal, or mono- or multi-unsaturated aliphatic aldehydes, such as 2-methyl but-2-enal, trans-2 hexenal, cis-3 hexenal, cis-4 hexenal, trans-2 octenal, trans-2 nonenal, cis-6 nonenal, trans-2, cis-6 nonadienal, trans 2 decenal, trans-2, trans-decadienal, aliphatic ketones, e.g. saturated ketones (such as 2-butanone, 2-pentanone, 2-heptanone, 2-octanone, 2-methylheptan-3-one, 2-decanone, 2-undecanone), unsaturated ketones (such as 1-penten-3-one, 1-hexen-3-one, 5-methyl-3-hexenone, 3-hepten-2-one, 1-octen-3-one, 2-octen-4-one, 3-octen-2-one, 3-none-2-one), aliphatic diketones and aliphatic diketoles, e.g. diacetyl, acetyl methyl carbinol, 2,3-hexanedione, aliphatic acids, such as straight-chain saturated acids, such as acetic acid, propionic acid, butyric acid, isobutyric acid, valeric acid, heptanoic acid, octanoic acid, decanoic acid, branched-chain saturated acids, such as 2-methyl heptanoic acid, 4-ethyl octanoic acid, and unsaturated acids, such as 2-butenoic acid, 2-pentenoic acid, 4-pentenoic acid, 2-methyl pentenoic acid, trans-3 hexenoic acid, cis-3 hexenoic acid, 3-octenoic acid, linoleic acid), aliphatic esters, such as saturated esters, e.g. methyl acetate, methylbutyrate, methyl-2-methylbutyrate, methyl hexanoate, ethylacetate, ethylbutyrate, ethyl-2-methylbutyrate, ethyl-3-methylbutyrate, ethyl hexanoate, ethyl decanoate, isopropyl acetate, isobutyl acetate, isobutyl valerate, isoamyl acetate, isoamyl butyrate, isoamyl isovalerate, hexyl acetate, hexyl hexanoate, 3-octyl acetate and unsaturated esters, such as methyl 2-hexenoate, allyl hexanoate, cis-3 hexenyl acetate, cis-3 hexenyl butyrate, aliphatic thiols and dithiols (e.g. propane thiol, allyl mercaptan, 1-methoxy-3-methylbutane-3-thiol, dimethyl sulfide, dimethyl trisulfide, dipropyl sulfide, diallyl trisulfide, other aliphatic sulfur compounds, such as 2-mercapto-3-butanol, methyl thio propanal, 3-mercapto-pentanone, 4-methoxy-2-methyl-2-mercaptobutanone, methyl thiobutyrate, methyl thiobutyrate, methyl 3-methylthiopropionate, aliphatic nitrogen compounds, such as butyl amine, trimethyl amine, allyl isothiocyanate, isopropyl isothiocyanate, alicyclic compounds, such as alicyclic ketones, e.g. cis-jasmone, isophorone, 4-ketoisophorone, alicyclic esters such as methyl jasmonate, hedione, terpenes, e.g. terpene alcohols, such as linalool, citronellol, geraniol, nerol, alpha terpineol, menthol, 8-p-menthene-1,2-diol, fenchol, borneol, nerolidol, hotrienol, terpene aldehydes such as geranial, neral, citronellal, beta-sinensal, terpene ketones, such as alpha-ionone, (D)-carvone, (L)-carvone, nootkatone, piperitone, menthone, alpha damascone, beta damascene, damascenone, terpene esters, such as linalyl acetate, geranyl acetate, citronellyl actetate, carvyl acetate, fenchyl acetate, terpene sulphur compounds, 4-mentha-8-thiol-3-one, thiogeraniol, para-menth-1-ene-8-thiol, mercapto p-menthan-3-one, terpene hydrocarbons, such as D-limonene, L-limonene, alpha-pinene, beta-pinene, ocimene, alpha-terpinene, gamma-terpinene, beta-bisabolene, valencene, terpene oxides, such as 1,8-cineole, rose oxide, mint lactone, menthofuran, aromatic compounds, e.g. aromatic alcohols, such as benzyl alcohol, cinnamyl alcohol, 2-phenyl alcohol, aromatic aldehydes, such as benzaldehyde, cinnamic aldehyde, 5-methyl-2-phenylhexenal, salicylaldehyde, 4-hydroxy benzaldehyde, cyclamen aldehyde, 2-phenyl-2-butenal, aromatic acids, such as 2-phenyl acetic acid, cinnamic acid, aromatic esters such as benzyl acetate, benzyl salicylate, anisyl acetate, methyl phenyl acetate, methyl benzoate, methyl salicylate, methyl cinnamate, aromatic phenols, such as phenol, ortho-cresol, para-cresol, 2,3-dimethyl phenyl, 2-ethyl phenol, 2,3,5-trimethyl phenol, 4-vinyl phenol, guaiacol, 4-vinyl guaiacol, eugenol, thymol, carvacrol, aromatic sulphur compounds, such as thiophenol, diphenyl disulphide, aromatic nitrogen compounds, such as methyl anthranilate, methyl N-methyl anthranilate, aromatic ethers such as vanillin, ethylvanillin, anethol, aromatic oxides, such as heliotropine, diphenyl oxide, aromatic lactones, such as coumarin, dihydro coumarin, heterocyclic compounds, such as heterocyclic lactones, e.g. gamma butyrolactone, gamma-nonalactone, gamma decalactone, delta decalactone, jasmin lactone, delta dodecalactone, ambrettolide, heterocyclic furanes, such as furfuryl alcohol, furfural, 2-acetyl furan, theaspirane, 2-methyl tetrahydrofuran-3-one, furfuryl mercaptane, 2-methyl 3-furanthiol, 2-methyl 3-tetrahydro furanthiol, difurfuryl sulfide, difurfuryl disulfide, heterocyclic pyrans, such as maltol, ethyl maltole, rose oxide, maltol isobutyrate, heterocyclic pyrroles such as indole, 2-acetyle pyrrole, pyrrolidine, heterocyclic pyrazines, such as 2-methyl pyrazine, 2,3-dimethyl pyrazine, 2-methyl 3-ethyl pyrazine, trimethyl pyrazine, 2-acetyl pyrazine, 2-methoxy 3-methyl pyrazine, 2-methoxy 3-ethyl pyrazine, 2-methoxy 3-isobutyl pyrazine, 2-ethyl 3-methylthio pyrazine, heterocyclic thiazoles, such as thiazole, 2-methyl thiazole, 4-methyl 5-vinyl thiazole, 2-isobutyl thiazole, 2-acetyl thiazole, flavouring raw materials and flavouring preparations, e.g. essential oils, concretes, absolutes, extract or tinctures from raw materials such citrus (e.g. lemon, lime, mandarine, bergamotte, grapefruit bitter orange, peel or essence oils), herbs (dill, parsley, cumin, rosemary, sage, clary sage, basil, tarragon, thyme, oregano, savoury, majoram, all spice, mace, nutmeg, clove leave, clove bud, caraway, cinnamom leaves, cinnamom bark, cassia, cardamom, ginger, galangal, turmeric, coriander seed, coriander leaf, fenugreek, juniper berry, wormwood, laurel leaves, eucalyptus, white pepper, green pepper, white pepper, carrot seed, celery seed, lovage leaf, asa foetida, onion, leek, garlic, mustard, horse radish, capsicum, paprika, sea weed, valerian oil, fir needle, spearmint, peppermint, wintergreen, buchu leaf, black currant buds, fennel, star anise, jambu, long pepper, davana, orris, mimosa, cassie, violet leaves, ho leaf, jasmin, ylang ylang, cananga, osmanthus, angelica, clary sage, ambrette seed, hops, camomile, lavender, rose, geranium, citronella, palmarosa, litsea cubeba, lemon grass, tagetes, neroli, petitgrain, mate, cognac oil, coffee, cola nut, cocoa, green tea, black tea, white tea, gentian, tolu balm, benzoe resin, peru balm, cascarilla, galbanum, vetiver, labdanum, patchouli, sandalwood, cedarwood, guaiac wood, oak wood, massoi bark, vanilla pods, tonka bean, as well as enriched fractions thereof, juice concentrates, such as orange juice, lemon juice, strawberry, cherry juice, or passion fruit juice concentrates, waterphases and recoveries from raw materials such as citrus (lemon, lime, orange, mandarine, grapefruit), apple, pear, quince, mispel, red fruits (raspberry, strawberry, blueberry, blackberry, Amellanchia (June plum), rose hip, cranberry, plum, prune, red and black currant, etc.) yellow fruits (peach, apricot, nectarine, banana, etc.), tropical fruits (mango, passionfruit, pineapple, lychee, etc.), vegetables (e.g. cucumber, tomato) and spices (e.g. ginger), acetophenone, allyl caproate, alpha-ionone, beta-ionone, anisaldehyde, anisyl acetate, anisyl formate, benzaldehyde, benzothiazole, benzyl acetate, benzyl alcohol, benzyl benzoate, beta-ionone, butyl butyrate, butyl caproate, butylidene phthalide, carvone, camphene, caryophyllene, cineol, cinnamyl acetate, citral, citronellol, citronellal, citronellyl acetate, cyclohexyl acetate, cymene, damascone, decalactone, dihydrocoumarin, dimethyl anthranilate, dodecalactone, ethoxyethyl acetate, ethylbutyric acid, ethyl butyrate, ethyl caprate, ethyl caproate, ethyl crotonate, ethylfuraneol, ethylguaiacol, ethylisobutyrate, ethylisovalerate, ethyl lactate, ethylmethyl butyrate, ethyl propionate, eucalyptol, eugenol, ethyl heptylate, 4-(p-hydroxyphenyl)-2-butanone, gamma-decalactone, geraniol, geranyl acetate, geranyl acetate, grapefruit aldehyde, methyl dihydrojasmonate (e.g. Hedion®), heliotropin, 2-heptanone, 3-heptanone, 4-heptanone, trans-2-heptenal, cis-4-heptenal, trans-2-hexenal, cis-3-hexenol, trans-2-hexenoic acid, trans-3-hexenoic acid, cis-2-hexenyl acetate, cis-3-hexenyl acetate, cis-3-hexenyl caproate, trans-2-hexenyl caproate, cis-3-hexenyl formate, cis-2-hexyl acetate, cis-3-hexyl acetate, trans-2-hexyl acetate, cis-3-hexyl formate, para-hydroxybenzyl acetone, isoamyl alcohol, isoamyl isovalerate, isobutyl butyrate, isobutyraldehyde, isoeugenol methyl ether, isopropyl methylthiazole, lauric acid, levulinic acid, linalool, linalool oxide, linalyl acetate, menthol, menthofuran, methyl anthranilate, methylbutanol, methylbutyric acid, 2-methylbutyl acetate, methyl caproate, methyl cinnamate, 5-methylfurfural, 3,2,2-methylcyclopentenolone, 6,5,2-methylheptenone, methyl dihydrojasmonate, methyljasmonate, 2-methylmethyl butyrate, 2-methyl-2-pentenol acid, methylthiobutyrate, 3,1-methylthiohexanol, 3-methylthiohexyl acetate, nerol, nerol acetate, trans,trans-2,4-nonadienal, 2,4-nonadienol, 2,6-nonadienol, 2,4-nonadienol, nootkatone, delta-octalactone, gamma-octalactone, 2-octanol, 3-octanol, 1,3-octenol, 1-octyl acetate, 3-octyl acetate, palmitic acid, paraldehyde, phellandrene, pentanedione, phenylethyl acetate, phenylethyl alcohol, phenylethyl isovalerate, piperonal, propionaldehyde, propyl butyrate, pulegone, pulegol, sinensal, sulfurol, terpinene, terpineol, terpinolene, 8,3-s thiomenthanone, 4,4,2-thiomethylpentanone, thymol, delta-undecalactone, gamma-undecalactone, valencene, valeric acid, vanillin, acetoin, ethylvanillin, ethylvanillin isobutyrate (=3-ethoxy-4-isobutyryloxybenzaldehyde), 2,5-dimethyl-4-hydroxy-3 (2H)-furanone and derivatives thereof (here preferably homofuraneol (=2-ethyl-4-hydroxy-5-methyl-3(2H)-furanone), homofuronol (=2-ethyl-5-methyl-4-hydroxy-3(2H)-furanone and 5-ethyl-2-methyl-4-hydroxy-3(2H)-furanone), maltol and maltol derivatives (here preferably ethyl maltol), coumarin and coumarin derivatives, gamma-lactones (here preferably gamma-undecalactone, gamma-nonalactone, gamma-decalactone), delta-lactones (here preferably 4-methyldeltadecalactone, massoilactone, deltadecalactone, tuberolactone), methyl sorbate, divanillin, 4-hydroxy-2(or 5)-ethyl-5 (or 2)-methyl-3 (2H) furanone, 2-hydroxy-3-methyl-2-cyclopentenone, 3-hydroxy-4,5-dimethyl-2(5H)-furanone, acetic acid isoamyl ester, butyric acid ethyl ester, butyric acid-n-butyl ester, butyric acid isoamyl ester, 3-methyl-butyric acid ethyl ester, n-hexanoic acid ethyl ester, n-hexanoic acid allyl ester, n-hexanoic acid-n-butyl ester, n-octanoic acid ethyl ester, ethyl-3-methyl-3-phenylglycidate, ethyl-2-trans-4-cis-decadienoate, 4-(p-hydroxyphenyl)-2-butanone, 1,1-dimethoxy-2,2,5-trimethyl-4-hexane, 2,6-dimethyl-5-hepten-1-al and phenylacetaldehyde, 2-methyl-3-(methylthio)furan, 2-methyl-3-furanthiol, bis(2-methyl-3-furyl)disulphide, furfurylmercaptan, methional, 2-acetyl-2-thiazoline, 3-mercapto-2-pentanone, 2,5-dimethyl-3-furanthiol, 2,4,5-trimethylthiazole, 2-acetylthiazole, 2,4-dimethyl-5-ethylthiazole, 2-acetyl-1-pyrroline, 2-methyl-3-ethylpyrazine, 2-ethyl-3,5-dimethylpyrazine, 2-ethyl-3,6-dimethylpyrazine, 2,3-diethyl-5-methylpyrazine, 3-isopropyl-2-methoxypyrazine, 3-isobutyl-2-methoxypyrazine, 2-acetylpyrazine, 2-pentylpyridine, (E,E)-2,4-decadienal, (E,E)-2,4-nonadienal, (E)-2-octenal, (E)-2-nonenal, 2-undecenal, 12-methyltridecanal, 1-penten-3-one, 4-hydroxy-2,5-dimethyl-3 (2H)-furanone, guaiacol, 3-hydroxy-4,5-dimethyl-2(5H)-furanone, 3-hydroxy-4-methyl-5-ethyl-2 (5H)-furanone, cinnamaldehyde, cinnamon alcohol, methyl salicylate, isopulegol and (here not explicitly stated) stereoisomers, enantiomers, positional isomers, diastereomers, cis/trans isomers or epimers of these substances.

Another aspect of the present invention relates to an aroma composition comprising naringenin in an amount of 10 ppm to 100 ppm, preferably of 16 ppm to 80 ppm, most preferably of 20 ppm to 50 ppm, and phloretin in an amount of 10 ppm to 100 ppm, preferably of 15 ppm to 80 ppm, most preferably of 20 ppm to 50 ppm, with the proviso that in case the preparation comprises 30 ppm phloretin, naringenin is not contained in an amount of 30 ppm, and in case the preparation comprises 15 ppm phloretin, naringenin is not contained in an amount of 15 ppm.

It was surprisingly found that aroma compositions having the above-described concentrations of naringenin and phloretin show a much more balanced taste profile, especially with regard to a decreased bitterness, increased mouthfeel, decreased astringency and/or increased sweetness, in comparison to a composition without the naringenin and phloretin concentrations according to the invention.

Preferably, the aroma composition comprises naringenin and phloretin in a weight ratio of from 1:5 to 5:1, preferably of from 1:3 to 3:1, more preferably of from 1:1.5 to 1.5:1.

Aroma compositions with these ratios of naringenin and phloretin show a much more balanced taste profile, especially with regard to a decreased bitterness, increased mouthfeel, decreased astringency and/or increased sweetness, in comparison to a composition without naringenin and/or phloretin or having a naringenin and phloretin ratio lying outside the ratio according to the invention.

It is also preferred in the context of the present invention that the aroma composition additionally comprises at least one compound conveying a sweet taste, preferably selected from the group consisting of natural sweeteners, preferably naturally occurring sweet tasting substances, including plant extracts, such as sweet tasting carbohydrates (such as sucrose, trehalose, lactose, maltose, melizitose, melibiose, raffinose, palatinose, lactulose, D-fructose, D-glucose, D-galactose, I-rhamnose, D-sorbose, D-mannose, D-tagatose, D-arabinose, I-arabinose, D-ribose, D-glyceraldehyde, maltodextrin), sugar alcohols (such as erythritol, threitol, arabitol, ribitol, xylitol, sorbitol, mannitol, maltitol, isomaltit, dulcitol, lactitol), proteins (such as miraculin, pentaidin, monellin, thaumatin, curculin, brazzein, mabinlin), D-amino acids (such as D-phenylalanine, D-tryptophan) or extracts or fractions obtained from natural sources containing these amino acids and/or proteins and the physiologically acceptable salts of these amino acids and/or proteins, particularly the sodium, potassium, calcium or ammonium salts thereof; neohesperidindihydrochalkon, naringindihydrochalkon, steviolgylcoside, stevioside, steviolbiosid, rebaudioside, rebaudioside A, rebaudioside B, rebaudioside C, rebaudioside D, rebaudioside E, rebaudioside F, rebaudioside G, rebaudioside H, rebaudioside M, rebaudioside N, rebaudioside X, dulcoside, rubusoside, suavioside A, suavioside B, suavioside G, suavioside H, suavioside I, suavioside J, baiyunoside 1, baiyunoside 2, phlomisoside 1, phlomisoside 2, phlomisoside 3, phlomisoside 4, abrusoside A, abrusoside B, abrusoside C, abrusoside D, cyclocaryoside A, cyclocaryoside I, oslandin, polypodoside A, strogin 1, strogin, 2, strogin 4, selligueanin A, dihydroquercetin-3-acetate, perillartin, telosmosid A15, periandrin I-V, pterocaryoside, cyclocaryoside, mukurozioside, trans-Anethol, trans-cinnamaldehyd, bryoside, bryonoside, bryonodulcoside, carnosifloside, scandenoside, gypenoside, hematoxylin, cyanin, chlorogenssure, albiziasaponin, telosmoside, gaudichaudiosid, mogrosides, such as mogroside V, hernandulcine, monatin, glycyrrhetinic acid and its derivatives, particularly glycyrrhizin, preferably glycyrrhizin ammonium salt; extracts or enriched fractions of such extracts such as extracts of thaumatococcus or *stevia* ssp., particularly *Stevia rebaudiana*, swingle extracts, particularly *Momordica* or siratio *grosvenorii* or Luo-Han-Guo, extracts of glycerrhyzia ssp., particularly glycerrhyzia *glabra*, extracts of *Rubus* ssp., particularly *Rubus suavissimus*, extracts of *Lippia dulcis*, extracts of *Mycetia balansae*, preferably comprising balansin A and/or balansin B;

synthetic sweeteners, preferably synthetic sweet tasting substances, preferably selected from the group consisting of magap, sodium cyclamate or other physiologically acceptable salts of cyclamic acid, acesulfam K; neohesperidindihydrochalcone, naringindihydrochalcone, saccharin, saccharin sodium salt, aspartam, superaspartam, neotam, alitam, advantam, perillartin, sucralose, lugduname, carrelame, sucrononate or sucrooctate or mixtures thereof.

Preferably, the aroma composition alternatively or additionally (further) comprises a flavouring, preferably selected from the group consisting of aliphatic flavouring substances, especially saturated aliphatic alcohols, such as ethanol, isopronanol, butanol, isoamyl alcohol, hexanol, 2-heptanol, octanol (1/2/3), decanol, unsaturated aliphatic alcohols, such as cis-2 pentenol, cis-3 hexenol, trans-2 hexenol, trans-3 hexenol, cis-2 octenol, 1-octen-3-ol, cis-6 nonen-1-ol, trans-2, cis-6 nonadienol, aliphatic aldehydes such as saturated aliphatic aldehydes (e.g. acetaldehyde, propionaldehyde, butyraldehyde, isobutyraldehyde, valeraldehyde, isolvaleraldehyde, hexanal, 3-methyl hexanal, octanal, nonanal, or mono- or multi-unsaturated aliphatic aldehydes, such as 2-methyl but-2-enal, trans-2 hexenal, cis-3 hexenal, cis-4 hexenal, trans-2 octenal, trans-2 nonenal, cis-6 nonenal, trans-2, cis-6 nonadienal, trans 2 decenal, trans-2, trans-decadienal, aliphatic ketones, e.g. saturated ketones (such as 2-butanone, 2-pentanone, 2-heptanone, 2-octanone, 2-methylheptan-3-one, 2-decanone, 2-undecanone), unsaturated ketones (such as 1-penten-3-one, 1-hexen-3-one, 5-methyl-3-hexenone, 3-hepten-2-one, 1-octen-3-one, 2-octen-4-one, 3-octen-2-one, 3-none-2-one), aliphatic diketones and aliphatic diketoles, e.g. diacetyl, acetyl methyl carbinol, 2,3-hexanedione, aliphatic acids, such as straight-chain saturated acids, such as acetic acid, propionic acid, butyric acid, isobutyric acid, valeric acid, heptanoic acid, octanoic acid, decanoic acid, branched-chain saturated acids, such as 2-methyl heptanoic acid, 4-ethyl octanoic acid, and unsaturated acids, such as 2-butenoic acid, 2-pentenoic acid, 4-pentenoic acid, 2-methyl pentenoic acid, trans-3 hexenoic acid, cis-3 hexenoic acid, 3-octenoic acid, linoleic acid), aliphatic esters, such as saturated esters, e.g. methyl acetate, methylbutyrate, methyl-2-methylbutyrate, methyl hexanoate, ethylacetate, ethylbutyrate, ethyl-2-methylbutyrate, ethyl-3-methylbutyrate, ethyl hexanoate, ethyl decanoate, isopropyl acetate, isobutyl acetate, isobutyl valerate, isoamyl acetate, isoamyl butyrate, isoamyl isovalerate, hexyl acetate, hexyl hexanoate, 3-octyl acetate and unsaturated esters, such as methyl 2-hexenoate, allyl hexanoate, cis-3 hexenyl acetate, cis-3 hexenyl butyrate, aliphatic thiols and dithiols (e.g. propane thiol, allyl mercaptan, 1-methoxy-3-methylbutane-3-thiol, dimethyl sulfide, dimethyl trisulfide, dipropyl sulfide, diallyl trisulfide, other aliphatic sulfur compounds, such as 2-mercapto-3-butanol, methyl thio propanal, 3-mercapto-pentanone, 4-methoxy-2-methyl-2-mercaptobutanone, methyl thiobutyrate, methyl thiobutyrate, methyl 3-methylthiopropionate, aliphatic nitrogen compounds, such as butyl amine, trimethyl amine, allyl isothiocyanate, isopropyl isothiocyanate, alicyclic compounds, such as alicyclic ketones, e.g. cis-jasmone, isophorone, 4-ketoisophorone, alicyclic esters such as methyl jasmonate, hedione, terpenes, e.g. terpene alcohols, such as linalool, citronellol, geraniol, nerol, alpha terpineol, menthol, 8-p-menthene-1,2-diol, fenchol, borneol, nerolidol, hotrienol, terpene aldehydes such as geranial, neral, citronellal, beta-sinensal, terpene ketones, such as alpha-ionone, (D)-carvone, (L)-carvone, nootkatone, piperitone, menthone, alpha damascone, beta damascene, damascenone, terpene esters, such as linalyl acetate, geranyl acetate, citronellyl actetate, carvyl acetate, fenchyl acetate, terpene sulphur compounds, 4-mentha-8-thiol-3-one, thiogeraniol, para-menth-1-ene-8-thiol, mercapto p-menthan-3-one, terpene hydrocarbons, such as D-limonene, L-limonene, alpha-pinene, beta-pinene, ocimene, alpha-terpinene, gamma-terpinene, beta-bisabolene, valencene, terpene oxides, such as 1,8-cineole, rose oxide, mint lactone, menthofuran, aromatic compounds, e.g. aromatic alcohols, such as benzyl alcohol, cinnamyl alcohol, 2-phenyl alcohol, aromatic aldehydes, such as benzaldehyde, cinnamic aldehyde, 5-methyl-2-phenylhexenal, salicylaldehyde, 4-hydroxy benzaldehyde, cyclamen aldehyde, 2-phenyl-2-butenal, aromatic acids, such as 2-phenyl acetic acid, cinnamic acid, aromatic esters such as benzyl acetate, benzyl salicylate, anisyl acetate, methyl phenyl acetate, methyl benzoate, methyl salicylate, methyl cinnamate, aromatic phenols, such as phenol, ortho-cresol, para-cresol, 2,3-dimethyl phenyl, 2-ethyl phenol, 2,3,5-trimethyl phenol, 4-vinyl phenol, guaiacol, 4-vinyl guaiacol, eugenol, thymol, carvacrol, aromatic sulphur compounds, such as thiophenol, diphenyl disulphide, aromatic nitrogen compounds, such as methyl anthranilate, methyl N-methyl anthranilate, aromatic ethers such as vanillin, ethylvanillin, anethol, aromatic oxides, such as heliotropine, diphenyl oxide, aromatic lactones, such as coumarin, dihydro coumarin, heterocyclic compounds, such as heterocyclic lactones, e.g. gamma butyrolactone, gamma-nonalactone, gamma decalactone, delta decalactone, jasmin lactone, delta dodecalactone, ambrettolide, heterocyclic furanes, such as furfuryl alcohol, furfural, 2-acetyl furan, theaspirane, 2-methyl tetrahydrofuran-3-one, furfuryl mercaptane, 2-methyl 3-furanthiol, 2-methyl 3-tetrahydro furanthiol, difurfuryl sulfide, difurfuryl disulfide, heterocyclic pyrans, such as maltol, ethyl maltole, rose oxide, maltol isobutyrate, heterocyclic pyrroles such as indole, 2-acetyle pyrrole, pyrrolidine, heterocyclic pyrazines, such as 2-methyl pyrazine, 2,3-dimethyl pyrazine, 2-methyl 3-ethyl pyrazine, trimethyl pyrazine, 2-acetyl pyrazine, 2-methoxy 3-methyl pyrazine, 2-methoxy 3-ethyl pyrazine, 2-methoxy 3-isobutyl pyrazine, 2-ethyl 3-methylthio pyrazine, heterocyclic thiazoles, such as thiazole, 2-methyl thiazole, 4-methyl 5-vinyl thiazole, 2-isobutyl thiazole, 2-acetyl thiazole, flavouring raw materials and flavouring preparations, e.g. essential oils, concretes, absolutes, extract or tinctures from raw materials such citrus (e.g. lemon, lime, mandarine, bergamotte, grapefruit bitter orange, peel or essence oils), herbs (dill, parsley, cumin, rosemary, sage, clary sage, basil, tarragon, thyme, oregano, savoury, majoram, all spice, mace, nutmeg, clove leave, clove bud, caraway, cinnamom leaves, cinnamom bark, cassia, cardamom, ginger, galangal, turmeric, coriander seed, coriander leaf, fenugreek, juniper berry, wormwood, laurel leaves, eucalyptus, white pepper, green pepper, white pepper, carrot seed, celery seed, lovage leaf, asa foetida, onion, leek, garlic, mustard, horse radish, capsicum, paprika, sea weed, valerian oil, fir needle, spearmint, peppermint, wintergreen, buchu leaf, black currant buds, fennel, star anise, jambu, long pepper, davana, orris, mimosa, cassie, violet leaves, ho leaf, jasmin, ylang ylang, cananga, osmanthus, angelica, clary sage, ambrette seed, hops, camomile, lavender, rose, geranium, citronella, palmarosa, litsea cubeba, lemon grass, tagetes, neroli, petitgrain, mate, cognac oil, coffee, cola nut, cocoa, green tea, black tea, white tea, gentian, tolu balm, benzoe resin, peru balm, cascarilla, galbanum, vetiver, labdanum, patchouli, sandalwood, cedarwood, guaiac wood, oak wood, massoi bark, vanilla pods, tonka bean, as well as enriched fractions thereof, juice concentrates, such as orange juice, lemon juice, strawberry, cherry juice, or passion fruit juice concentrates, waterphases and recoveries from raw materials such as citrus (lemon, lime, orange, mandarine, grapefruit), apple, pear, quince, mispel, red fruits (raspberry, strawberry, blueberry, blackberry, Amellanchia (June plum), rose hip, cranberry, plum, prune, red and black currant, etc.) yellow fruits (peach, apricot, nectarine, banana, etc.), tropical fruits (mango, passionfruit, pineapple, lychee, etc.), vegetables (e.g. cucumber, tomato) and spices (e.g. ginger), acetophenone, allyl caproate, alpha-ionone, beta-ionone, anisaldehyde, anisyl acetate, anisyl formate, benzaldehyde, benzothiazole, benzyl acetate, benzyl alcohol, benzyl benzoate, beta-ionone, butyl butyrate, butyl caproate, butylidene phthalide, carvone, camphene, caryophyllene, cineol, cinnamyl acetate, citral, citronellol, citronellal, citronellyl acetate, cyclohexyl acetate, cymene, damascone, decalactone, dihydrocoumarin, dimethyl anthranilate, dodecalactone, ethoxyethyl acetate, ethylbutyric acid, ethyl butyrate, ethyl caprate, ethyl caproate, ethyl crotonate, ethylfuraneol, ethylguaiacol, ethylisobutyrate, ethylisovalerate, ethyl lactate, ethylmethyl butyrate, ethyl propionate, eucalyptol, eugenol, ethyl heptylate, 4-(p-hydroxyphenyl)-2-butanone, gamma-decalactone, geraniol, geranyl acetate, geranyl acetate, grapefruit aldehyde, methyl dihydrojasmonate (e.g. Hedion®), heliotropin, 2-heptanone, 3-heptanone, 4-heptanone, trans-2-heptenal, cis-4-heptenal, trans-2-hexenal, cis-3-hexenol, trans-2-hexenoic acid, trans-3-hexenoic acid, cis-2-hexenyl acetate, cis-3-hexenyl acetate, cis-3-hexenyl caproate, trans-2-hexenyl caproate, cis-3-hexenyl formate, cis-2-hexyl acetate, cis-3-hexyl acetate, trans-2-hexyl acetate, cis-3-hexyl formate, para-hydroxybenzyl acetone, isoamyl alcohol, isoamyl isovalerate, isobutyl butyrate, isobutyraldehyde, isoeugenol methyl ether, isopropyl methylthiazole, lauric acid, levulinic acid, linalool, linalool oxide, linalyl acetate, menthol, menthofuran, methyl anthranilate, methylbutanol, methylbutyric acid, 2-methylbutyl acetate, methyl caproate, methyl cinnamate, 5-methylfurfural, 3,2,2-methylcyclopentenolone, 6,5,2-methylheptenone, methyl dihydrojasmonate, methyljasmonate, 2-methylmethyl butyrate, 2-methyl-2-pentenol acid, methylthiobutyrate, 3,1-methylthiohexanol, 3-methylthiohexyl acetate, nerol, nerol acetate, trans,trans-2,4-nonadienal, 2,4-nonadienol, 2,6-nonadienol, 2,4-nonadienol, nootkatone, delta-octalactone, gamma-octalactone, 2-octanol, 3-octanol, 1,3-octenol, 1-octyl acetate, 3-octyl acetate, palmitic acid, paraldehyde, phellandrene, pentanedione, phenylethyl acetate, phenylethyl alcohol, phenylethyl isovalerate, piperonal, propionaldehyde, propyl butyrate, pulegone, pulegol, sinensal, sulfurol, terpinene, terpineol, terpinolene, 8,3-s thiomenthanone, 4,4,2-thiomethylpentanone, thymol, delta-undecalactone, gamma-undecalactone, valencene, valeric acid, vanillin, acetoin, ethylvanillin, ethylvanillin isobutyrate (=3-ethoxy-4-isobutyryloxybenzaldehyde), 2,5-dimethyl-4-hydroxy-3 (2H)-furanone and derivatives thereof (here preferably homofuraneol (=2-ethyl-4-hydroxy-5-methyl-3(2H)-furanone), homofuronol (=2-ethyl-5-methyl-4-hydroxy-3(2H)-furanone and 5-ethyl-2-methyl-4-hydroxy-3(2H)-furanone), maltol and maltol derivatives (here preferably ethyl maltol), coumarin and coumarin derivatives, gamma-lactones (here preferably gamma-undecalactone, gamma-nonalactone, gamma-decalactone), delta-lactones (here preferably 4-methyldeltadecalactone, massoilactone, deltadecalactone, tuberolactone), methyl sorbate, divanillin, 4-hydroxy-2(or 5)-ethyl-5 (or 2)-methyl-3 (2H) furanone, 2-hydroxy-3-methyl-2-cyclopentenone, 3-hydroxy-4,5-dimethyl-2(5H)-furanone, acetic acid isoamyl ester, butyric acid ethyl ester, butyric acid-n-butyl ester, butyric acid isoamyl ester, 3-methyl-butyric acid ethyl ester, n-hexanoic acid ethyl ester, n-hexanoic acid allyl ester, n-hexanoic acid-n-butyl ester, n-octanoic acid ethyl ester, ethyl-3-methyl-3-phenylglycidate, ethyl-2-trans-4-cis-decadienoate, 4-(p-hydroxyphenyl)-2-butanone, 1,1-dimethoxy-2,2,5-trimethyl-4-hexane, 2,6-dimethyl-5-hepten-1-al and phenylacetaldehyde, 2-methyl-3-(methylthio)furan, 2-methyl-3-furanthiol, bis(2-methyl-3-furyl)disulphide, furfurylmercaptan, methional, 2-acetyl-2-thiazoline, 3-mercapto-2-pentanone, 2,5-dimethyl-3-furanthiol, 2,4,5-trimethylthiazole, 2-acetylthiazole, 2,4-dimethyl-5-ethylthiazole, 2-acetyl-1-pyrroline, 2-methyl-3-ethylpyrazine, 2-ethyl-3,5-dimethylpyrazine, 2-ethyl-3,6-dimethylpyrazine, 2,3-diethyl-5-methylpyrazine, 3-isopropyl-2-methoxypyrazine, 3-isobutyl-2-methoxypyrazine, 2-acetylpyrazine, 2-pentylpyridine, (E,E)-2,4-decadienal, (E,E)-2,4-nonadienal, (E)-2-octenal, (E)-2-nonenal, 2-undecenal, 12-methyltridecanal, 1-penten-3-one, 4-hydroxy-2,5-dimethyl-3 (2H)-furanone, guaiacol, 3-hydroxy-4,5-dimethyl-2(5H)-furanone, 3-hydroxy-4-methyl-5-ethyl-2 (5H)-furanone, cinnamaldehyde, cinnamon alcohol, methyl salicylate, isopulegol and (here not explicitly stated) stereoisomers, enantiomers, positional isomers, diastereomers, cis/trans isomers or epimers of these substances.

Another aspect of the present invention relates to a method for decreasing the bitterness and/or improving the mouthfeel and/or decreasing the astringency and/or improving the sweetness intensity of a preparation comprising phloretin, comprising the steps of:

i. providing a preparation comprising phloretin;

ii. adding naringenin in an amount that the weight ratio of phloretin and naringenin is from 1:5 to 5:1, preferably of from 1:3 to 3:1, more preferably of from 1:1.5 to 1.5:1;

iii. obtaining a preparation with a decreased bitterness and/or improved mouthfeel and/or decreased astringency and/or improved sweetness intensity, in comparison to such preparation not comprising naringenin, with the proviso that in case the preparation comprises 30 ppm phloretin, naringenin is not added in an amount of 30 ppm, and in case the preparation comprises 15 ppm phloretin, naringenin is not added in an amount of 15 ppm.

Preferably, the naringenin added in step ii. is added in an amount of 10 ppm to 100 ppm, preferably of 16 ppm to 80 ppm, most preferably of 20 ppm to 50 ppm, based on the total amount of the preparation.

It is preferred that the preparation is selected from the group consisting of aroma compositions, preparations intended for nutrition, enjoyment or cosmetic or pharmaceutical purposes, and semi-finished products for producing such preparations.

Furthermore, the above described (mentioned in connection with the other aspects according to the invention and, in particular, the respective preferred embodiments) equally applies to the method according to the invention.

Another aspect of the present invention relates to a semi-finished product for producing preparations intended for nutrition, enjoyment or cosmetic or pharmaceutical purposes, preferably preparations as described above, wherein the semi-finished product comprises an aroma composition according to the present invention, or naringenin in an amount of 10 ppm to 100 ppm, preferably of 16 ppm to 80 ppm, most preferably of 20 ppm to 50 ppm, and phloretin in an amount of 10 ppm to 100 ppm, preferably of 15 ppm to 80 ppm, most preferably of 20 ppm to 50 ppm, with the proviso that in case the preparation comprises 30 ppm phloretin, naringenin is not contained in an amount of 30 ppm, and in case the preparation comprises 15 ppm phloretin, naringenin is not contained in an amount of 15 ppm.

One aspect of the present invention relates to a product intended for nutrition, enjoyment or cosmetic or pharmaceutical purposes, comprising the aroma composition according to the invention or a semi-finished product according the invention or naringenin in an amount of 10 ppm to 100 ppm, preferably of 16 ppm to 80 ppm, most preferably of 20 ppm to 50 ppm, and phloretin in an amount of 10 ppm to 100 ppm, preferably of 15 ppm to 80 ppm, most preferably of 20 ppm to 50 ppm, with the proviso that in case the preparation comprises 30 ppm phloretin, naringenin is not contained in an amount of 30 ppm, and in case the preparation comprises 15 ppm phloretin, naringenin is not contained in an amount of 15 ppm.

Again, the above described (mentioned in connection with the other aspects according to the invention and, in particular, the respective preferred embodiments) equally applies to the (semi-finished) products according to the invention, too.

SHORT DESCRIPTION OF FIGURES

Figure 2:
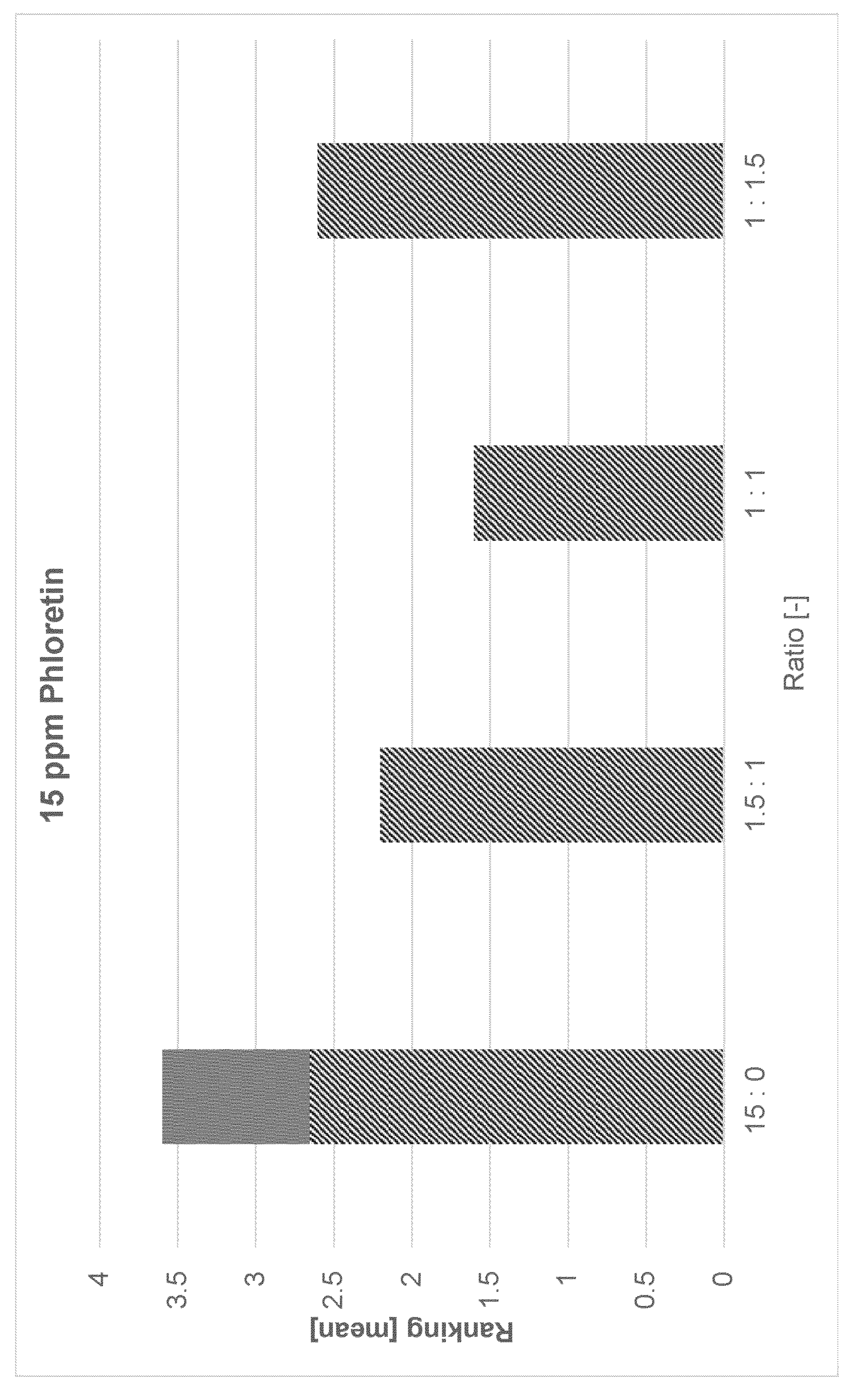
Figure 3:
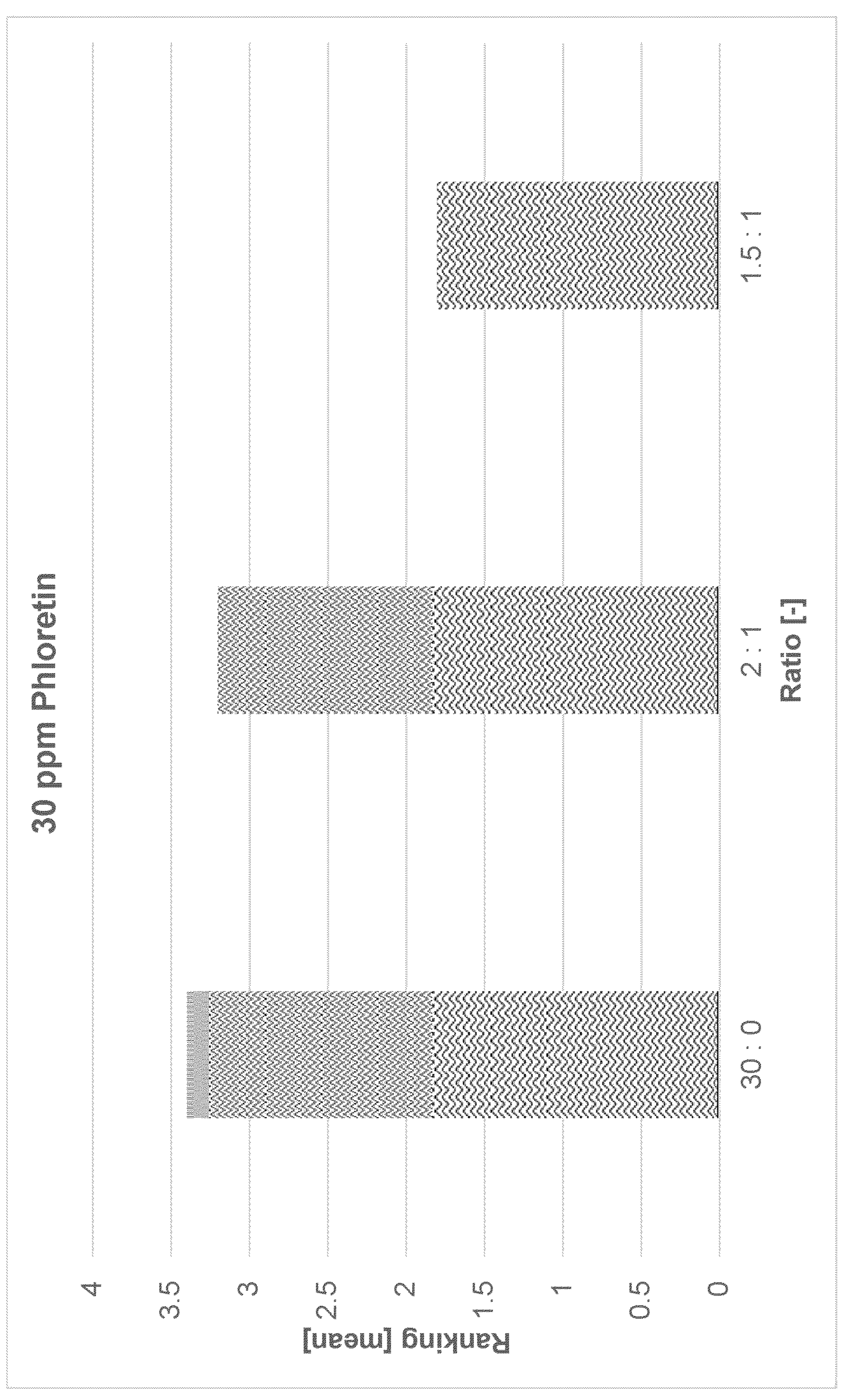
Figure 4:
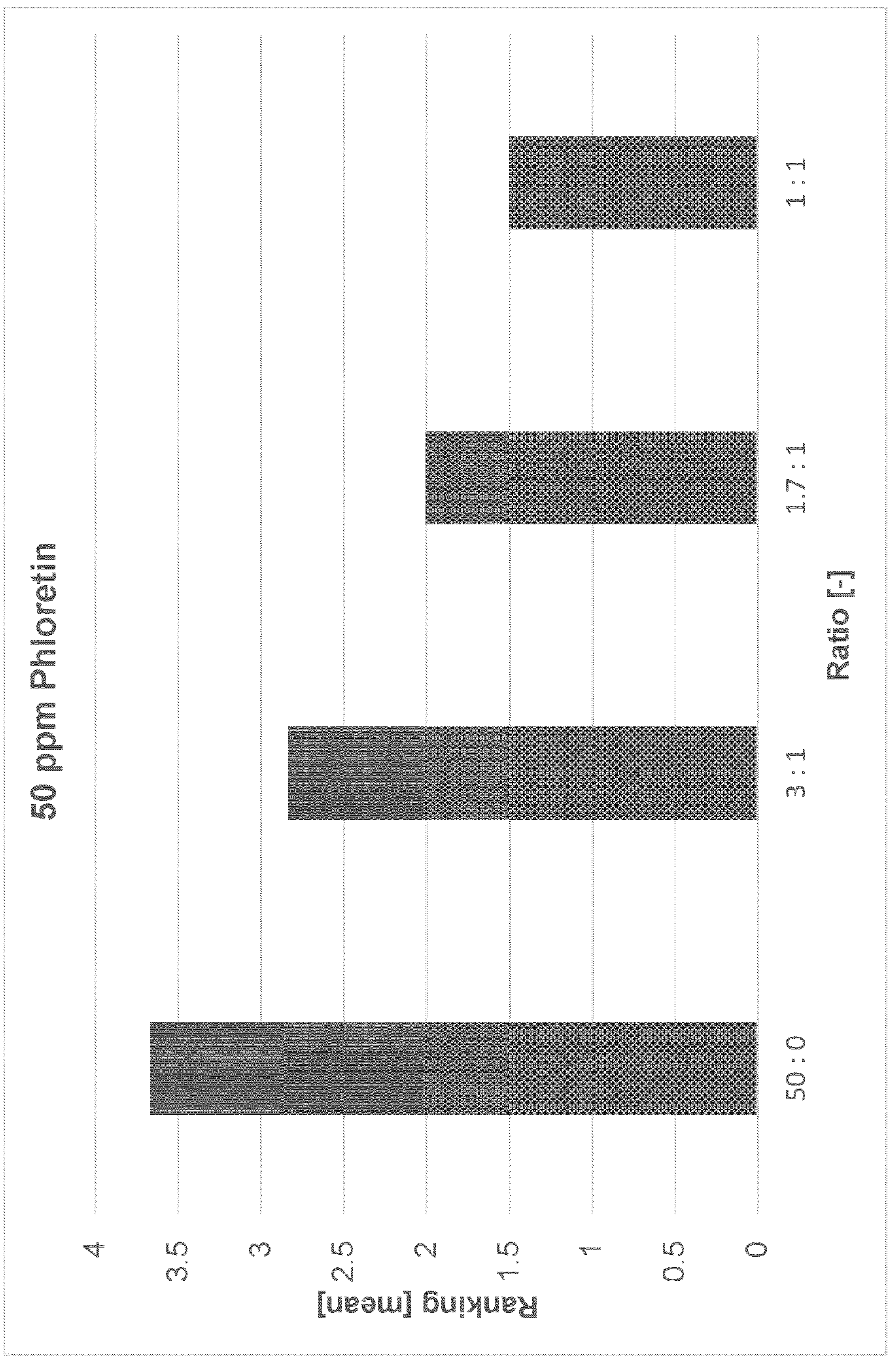

FIG. 1 describes the bitterness perception of compositions comprising different amounts of naringenin. A bitterness perception of 4 means the highest bitterness, wherein 1 is the lowest bitterness FIG. 2 describes the bitterness perception of compositions having different ratios of phloretin and naringenin at a phloretin concentration of 15 ppm. A bitterness perception of 4 means the highest bitterness, wherein 1 is the lowest bitterness FIG. 3 describes the bitterness perception of compositions having different ratios of phloretin and naringenin at a phloretin concentration of 30 ppm. A bitterness perception of 4 means the highest bitterness, wherein 1 is the lowest bitterness FIG. 4 describes the bitterness perception of compositions having different ratios of phloretin and naringenin at a phloretin concentration of 80 ppm. A bitterness perception of 4 means the highest bitterness, wherein 1 is the lowest bitterness

EXAMPLES

Samples of phloretin and naringenin at different concentrations in water were given to a panel of experienced flavorists. The bitterness of the sample was ranked based on their bitterness. The most bitter sample has the highest rank, wherein the least bitter sample has the smallest rank.

| Phloretin (ppm) | Naringenin (ppm) | Ratio | Ranking (mean) |
|---|---|---|---|
| 15 | 0 | — | 3.6 |
| 15 | 10 | 1.5:1 | 2.2 |
| 15 | 15 | 1:1 | 1.6 |
| 15 | 22.5 | 1:1.5 | 2.6 |
| 30 | 0 | — | 3.4 |
| 30 | 15 | 2:1 | 3.2 |
| 30 | 20 | 1.5:1 | 1.8 |
| 50 | 0 | — | 3.67 |
| 50 | 17 | 3:1 | 2.83 |
| 50 | 30 | 1.7:1 | 2 |
| 50 | 50 | 1:1 | 1.5 |

The data as shown above are also depicted in the FIGS. 1 to 4.

Formulation Examples (FE)

FE-1: Aroma composition (wt.-%)

| Composition | A | B | C | D | E | F |
|---|---|---|---|---|---|---|
| Naringenin | 3 | 2 | 1 | 2 | 1 | 2 |
| Phloretin | 3 | 3 | 2 | 3 | 1 | 2 |
| Reb A | | | | 5 | 8 | |
| Stevia extract | | | | | | 10 |
| Lemon flavor key | 10 | | | | | 10 |
| Lemon-Lime flavor | | | | 12 | 12 | |
| Citrus flavor key | | 10 | | | | |
| Vanilla extract | | | 5 | | | |
| Glycerin | | | 25 | | | |
| 1,2-Propylenglycol | | | Ad 100 | | | |

FE-2: Soft drinks (wt.-%)

| Ingredients | A | B | C | D | E | F | G |
|---|---|---|---|---|---|---|---|
| Sucrose | 10 | 10 | 7 | 4 | — | 4 | 7 |
| Glucose/Fructose Syrup | — | — | — | — | 10 | — | — |
| Reb A | | | | 0.02 | | | |
| Sucralose | | | | | | 0.005 | |
| Phloretin/Naringenin mixture 1:1 | 0.003 | 0.005 | 0.003 | 0.01 | | | |
| Phloretin/Naringenin mixture 3:2 | | | | | 0.0045 | 0.0025 | 0.002 |
| Citric acid | 0.15 | 0.15 | 0.06 | 0.15 | 0.15 | 0.15 | 0.15 |
| Phosphoric acid | — | — | 0.07 | — | — | — | — |
| Caramell color | — | — | 0.14 | — | — | — | — |
| Caffeine | — | — | 0.01 | — | — | — | — |
| Citrus flavor | 0.1 | 0.05 | — | 0.1 | 0.1 | 0.1 | 0.1 |
| Lime flavor | — | 0.05 | — | — | — | — | — |
| Beverage emulsion Type "Cola" | — | — | 0.05 | — | — | — | — |
| Water | | | | Ad 100 | | | |

Preparation: The ingredients are blended in the given order and filled with water to 100 wt.-%. Afterwards the mixtures are filled in glass bottles and are carbonated.

FE-3: Low fat yoghurt (wt.-%)

| Ingredients | A | B | C | D |
|---|---|---|---|---|
| Sucrose | 10 | 8 | 6 | — |
| Sucralose | — | 0.02 | — | 0.02 |
| Rebaudioside A >95% | — | — | 0.025 | — |
| Saccharin | — | — | — | 0.01 |
| Phloretin/Naringenine 2:1 | 0.005 | 0.0045 | 0.01 | 0.050 |
| Strawberry flavor | 0.12 | 0.12 | | |
| Cherry flavor | | | 0.1 | 0.1 |
| yoghurt, 0.1% fat | | Ad 100 | | |

The invention claimed is:

1. A composition for decreasing bitterness and/or improving mouthfeel of a finished product comprising:

(a) 20 ppm to 50 ppm of naringenin;

(b) 20 ppm to 50 ppm of phloretin;

provided (a) and (b) are in a weight ratio of 1.5:1 to 1:1.5;

(c) at least one compound conveying a sweet taste; and (d) at least one flavouring;

wherein the naringenin decreases bitterness of the finished product in comparison to the same finished product that does not comprise the naringenin, as determined by a panel of trained tasters.

2. The composition of claim 1, wherein the at least one compound conveying a sweet taste is a natural sweetener.

3. The composition of claim 2, wherein the natural sweetener is a sweet tasting carbohydrate.

4. The composition of claim 3, wherein the sweet tasting carbohydrate is selected from sucrose, trehalose, lactose, maltose, melizitose, melibiose, raffinose, palatinose, lactulose, D-fructose, D-glucose, D-galactose, 1-rhamnose, D-sorbose, D-mannose, D-tagatose, D-arabinose, 1-arabinose, D-ribose, D-glyceraldehyde, and maltodextrin.

5. The composition of claim 4, wherein the sweet tasting carbohydrate is sucrose.

6. The composition of claim 2, wherein the natural sweetener is a steviol glycoside.

7. The composition of claim 6, wherein the steviol glycoside is a rebaudioside.

8. The composition of claim 7, wherein the rebaudioside is rebaudioside A.

9. The composition of claim 1, wherein the at least one compound conveying a sweet taste is a synthetic sweetener.

10. The composition of claim 1, wherein the weight ratio is about 1:1.

* * * * *